(No Model.)

C. HERMANY & C. G. SNEAD.
FEED BOX.

No. 564,788. Patented July 28, 1896.

WITNESSES:
W. S. Blondel
Chas. E. Brock

INVENTORS
Charles Hermany.
C. G. Snead.
BY
R. S. H. Lacey
ATTORNEYS.

THE NORRIS PETERS CO., PHOTO-LITHO., WASHINGTON, D. C.

UNITED STATES PATENT OFFICE.

CHARLES HERMANY AND CHARLES G. SNEAD, OF LOUISVILLE, KENTUCKY.

FEED-BOX.

SPECIFICATION forming part of Letters Patent No. 564,788, dated July 28, 1896.

Application filed December 18, 1895. Serial No. 572,615. (No model.)

*To all whom it may concern:*

Be it known that we, CHARLES HERMANY and CHARLES G. SNEAD, residing in Louisville, in the county of Jefferson and State of Kentucky, have invented an Improved Feed-Box, of which the following is a specification.

Our invention relates generally to that class of feed-boxes known as "automatic" feed-boxes, in which the feed is automatically moved into the reach of the animal.

The object of the invention is to provide a feed-box of this description which shall be of such construction that it will be impossible for the animal to waste any of the feed from the box, and it will also be impossible for the animal to eat too rapidly and gorge himself.

With these prime objects in view and with certain other minor objects as will appear hereinafter our invention consists in the peculiar construction of the various parts and their novel combination and arrangement, all of which will be fully described, and pointed out in the claims.

Figure 1:
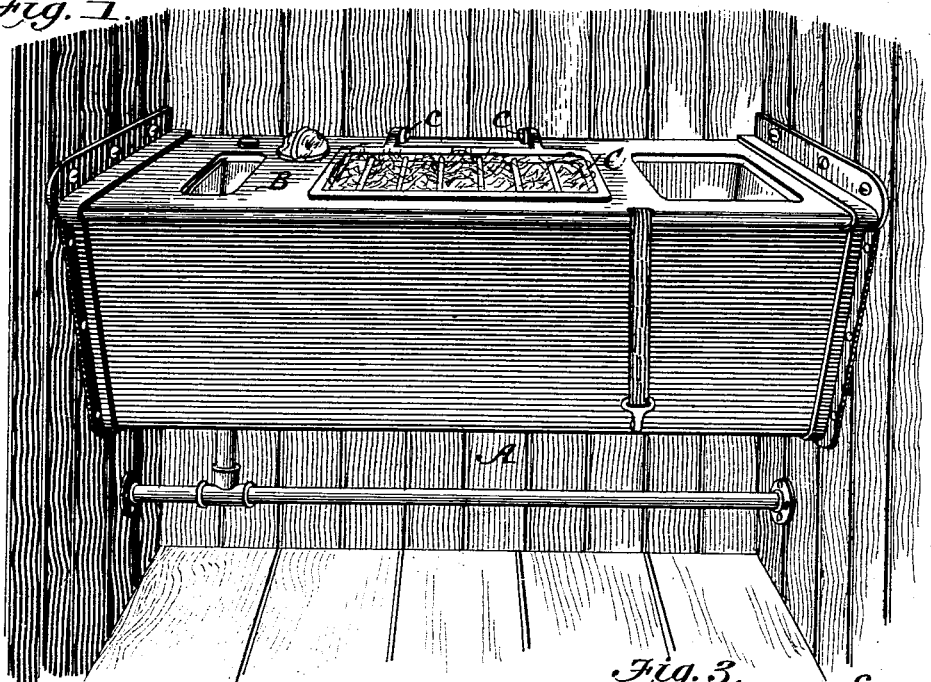
Figure 2:
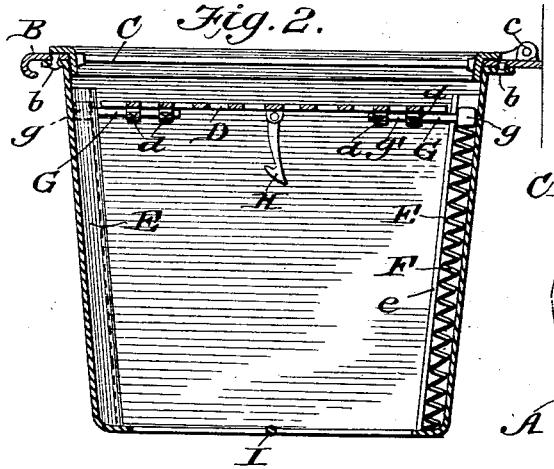
Figure 3:
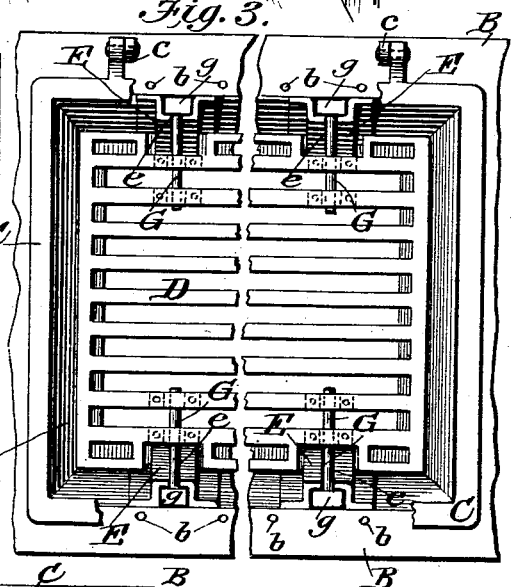

In the drawings forming a part of this specification, Figure 1 is a view showing our improved feed-box arranged in a stall. Fig. 2 is a vertical sectional view. Fig. 3 is a top plan view, and Fig. 4 a sectional view, of a slightly-modified form of construction.

In carrying out our invention we employ a box A, which is preferably cast of metal, although said box could be constructed of any desired material. The box is also made slightly tapering toward the bottom, though this construction is not absolutely essential.

The box A is formed with an open bottom, as clearly shown, and at the top of said box is arranged the frame B, by means of which the box is supported within the stall. This frame B is preferably cast separate from the box and attatched to the top thereof by bolts or rivets *b*; but it is obvious that said frame could be cast integral with the top of box, if so desired.

The grid or grating C is hinged to the frame B, at one side thereof, and normally rests upon the opposite side of said frame, as clearly shown; and, if desired, this end of the grid or grating may be secured in any suitable manner, in order to prevent the animal lifting the same. The grid is preferably hinged to lugs *c*, formed upon the frame B, but the manner of connecting this grid to the frame is immaterial, and likewise its location; but in practice we have found the construction shown to answer very well, but it will of course be understood that we do not limit ourselves to this precise arrangement.

Arranged within the box and adapted to support the hay or feed therein is a vertically-movable elevator or platform D, which is pressed upward by a series of springs and thereby holds the feed against the grid or grating, thus allowing the animal to eat thereof, and as the feed is consumed the action of the springs will force the elevator or platform upward, thus maintaining a constant supply of feed for the horse, but preventing any overeating or gorging.

While there are various means for automatically projecting this elevator or platform upward, we have shown two which we have found thoroughly practical in operation.

By referring to Figs. 1, 2, and 3, it will be seen that we provide slotted guideways E upon the interior sides of the box, and located in said guideways are the spiral springs F, and moving in the slots *e* of the guideways are the bolts G, the flat heads *g* thereof resting upon the top of the spiral spring, while the shank *g'* slides in keepers *d*, arranged upon the bottom of the platform at points directly opposite the slots in the guides.

Depending from the bottom of the elevator or platform is a pivotal or gravity catch H, having a nose or dog at its lower end adapted to engage the latch-bar I, extending across the opening in the bottom of the box.

Now, in operation, when it is desired to fill the box with feed, either hay, long or short, or grain, the platform or elevator is forced down by hand and the catch automatically engages the latch-bar and holds said platform in its lowermost position. In so forcing the platform downward the bolts are caused to slide inward, owing to the taper of the box, and the connection between said bolts and platform is of such character as to permit this sliding movement. The springs within the guides will of course be compressed and power stored therein to lift the platform when desired. The feed is now placed within the box and the grid or grating turned down and fastened. The catch can be released at any time by being thrown back, either with the hand or foot, and when so released the spring causes the platform or elevator to press the feed upward against the grid, as before described.

Figure 4:
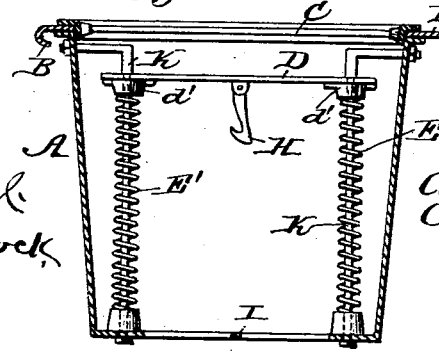

In Fig. 4 we have shown a somewhat-modified form of construction by means of which the tubular guides and sliding bolts are dispensed with, and in their stead the guide-rods K employed. These guide-rods, four in number, are essentially right angular in shape, the short arms being passed through the sides of the box and secured by riveting or other means, while the lower ends of the long arms are fastened in the rim or flange at the lower edge of the box. These rods are passed through the corners of the elevator or platform, and at said corners said platform is preferably constructed with collars or sleeves $d'$ to insure a steady movement of the platform upon the guide-rods. Surrounding the guide-rods beneath the elevator or platform are the coil-springs E', which operate exactly the same as the coil-springs before referred to. The gravity-catch and latch-bar are constructed, arranged, and operated identically the same in this construction as in the construction shown in Figs. 1, 2, and 3. The right-angular form of the rods also serve to prevent the platform being projected too far upward.

It will thus be seen that we have provided a feed-box which will automatically move the feed within the reach of the animal and one which will prevent the animal eating too rapidly or wasting the food.

While we have illustrated our feed-box as arranged alone within a stall, it is obvious that it can be constructed in combination with any convenient form of watering-trough or other suitable appliances.

Having thus described our invention, what we desire to secure by Letters Patent is—

1. In a feed-box having tapering sides, the slotted guideways formed upon the interior sides of said box, the coil-springs located in said guideways, the bolts having rounded heads resting in the guideways upon the springs, and the elevator or platform having keepers upon the bottom in which slide the shanks of the bolts all arranged, substantially as shown and described.

2. In a feed-box the combination with the box having tapering sides of the hinged grid or grating at the top of said box, the slotted guideways arranged upon the sides of said box, the coil-springs located therein, the bolts having heads resting within the guideways, and the platform having keepers upon the bottom, in which slide the shanks of the bolts, substantially as shown and described.

3. In a feed-box, the combination with the box of the hinged grid or grating at the top thereof, the vertically-movable elevator or platform having keepers upon the bottom, and the pendent gravity-catch arranged also upon the bottom, a latch-bar arranged across the opening at the bottom of the box, the slotted guideways, the springs located in said guideways, the bolts having heads in the guideways, and shanks adapted to slide in the keepers, substantially as shown and described.

In testimony whereof we affix our signatures in the presence of two witnesses.

CHARLES HERMANY.
C. G. SNEAD.

Witnesses to signature of Charles Hermany:
   P. J. MARRET,
   BEVERLEY ALLEN.

Witnesses to signature of Chas. G. Snead:
   CHAS. E. BROCK,
   L. M. ROCHE.